United States Patent Office 3,285,955
Patented Nov. 15, 1966

3,285,955
PRODUCTION OF CYCLIC CARBOXYLIC ACIDS BY THERMAL CONVERSION OF SALTS OF OTHER CYCLIC CARBOXYLIC ACIDS
Walter Schenk, Heidelberg, and Albrecht Wallis and Rudi Schanz, Ludwigshafen (Rhine), Germany, assignors to Badische Anilin- & Soda-Fabrik Aktiengesellschaft, Ludwigshafen (Rhine), Germany
No Drawing. Filed June 7, 1962, Ser. No. 200,666
Claims priority, application Germany, June 8, 1961, B 62,817
8 Claims. (Cl. 260—515)

This invention relates to an improvement in the known process for the production of aromatic cyclic carboxylic acids from alkali salts of other cyclic carboxylic acids by purely thermal conversion of dry alkali metal salts of aromatic cyclic carboxylic acids other than the desired cyclic carboxylic acids in the presence of known catalysts for thermal conversion and, if desired, liberation of the desired carboxylic acids from the mixture of salts from the thermal conversion in the conventional manner by treatment of the mixture with acid substances which are more strongly acid than the desired cyclic carboxylic acids.

The invention relates in particular to an improvement in the production of the mixtures of salts which are suitable for thermal conversion and which contain the alkali metal salts of the carboxylic acids to be converted and the catalyst.

It is known that alkali metal salts of aromatic cyclic carboxylic acids are obtained by heating alkali metal salts of other carboxylic acids, for example, isomers thereof, at a temperature between approximately 280 and 480° C. in the presence of catalysts at ordinary or increased pressure. The production of the starting mixture usually takes place in such a way that the aromatic cyclic acids to be converted into cyclic carboxylic acids are converted into their alkali metal salts, preferably their potassium salts, for example, by neutralization of the acids with potassium hydroxide or carbonate or by fusion of the acids or their anhydrides with suitable potassium compounds, and the catalyst is added to the dry salts. The proportion of catalyst added to the alkali metal salts varies between approx. 0.5 and 5 percent by weight, calculated on the alkali metal salt. Known catalysts which have given good results include zinc, iron and cadmium oxide and carbonate and the salts of organic acids of these metals. The thermal treatment of the dry salt mixture thus obtained is then carried out either batchwise or continuously by heating to the desired temperature, preferably in an atmosphere of carbon dioxide at a pressure of 1 to approx. 300 atm. The free carboxylic acids can, if desired,, be readily obtained from the salt mixture produced by the thermal treatment by acidification either with a mineral acid, or with the cyclic carboxylic acids employed as starting materials, or with carbon dioxide under pressure.

It is possible by this known purely thermal process to obtain, for example, terephthalic acid from the alkali metal salts, for example, the potassium salts of benzoic acid, phthalic acid, or isophthalic acid, or from benzenecarboxylic acids with 3 to 6 carboxyl groups linked to the benzene ring, these carboxyl groups being present either completely or partially, for example 50 percent, in combined form. Alkali metal salts, such as the potassium salts of naphthalenedicarboxylic acid, are known to be converted by dry heating to the corresponding salts of 2,6-naphthalenedicarboxylic acid while pyrroledicarboxylic acid and salicylic acid yield the corresponding salts of 2,5-pyrroledicarboxylic acid and 4-hydroxybenzoic acid when the potassium salts are heated dry. The corresponding salts of 4,4'-diphenyldicarboxylic acid are obtained from the alkali metal salts such as the potassium salts of diphenyldicarboxylic acids, for example, diphenic acid, simply by heating. Similarly, isocinchomeronic acid is obtained fro pyridinedicarboxylic acid, 2,5-furandicarboxylic acid from furandicarboxylic acid and 2,5-thiophendicarboxylic acid from thiophenic acids. Mixtures of alkali metal salts containing different alkali metals are also suitable for the purely thermal conversion in question in place of the potassium salts referred to. Thus, mixtures of potassium and sodium salts of the starting acids, in which the sodium content varies between 0.5 and 70 percent by weight, are also suitable.

The main object of the present invention is to improve the known purely thermal conversion of alkali metal salts of aromatic cyclic carboxylic acids to salts of cyclic carboxylic acids other than the starting carboxylic acids using the known catalysts for such conversions. The invention is based on the observation that the yield, and also the extent to which the product chars during heating in the thermal conversion as hitherto carried out depends not so much on whether the mixture of salts containing catalyst is present in the reaction zone which may be, for example a rotary reactor, conveyor-type reactor or multi-deck reactor, heated to approx. 280 to 480° C., in loose or compact form or as a pressed moulding as on the way in which the mixture of salts containing catalyst is produced and on the state of division in which the catalyst consisting of metal salts or metal compounds is present in the mixture of alkali metal salts of cyclic carboxylic acids to be converted. A further object of the invention consists in the production of mixtures and salts particularly suitable for the known thermal conversion. Yet another object of the invention consists in the production of a mixture of salts containing catalyst for the known thermal conversion in which the catalyst is present in a very fine and therefore very active state of division and in which the catalyst is substantially uniformly dispersed in the alkali metal salts of the carboxylic acids to be converted. A further object of the invention consists in the improvement of the yields in the known thermal conversion of dry alkali metal salts of aromatic cyclic carboxylic acids to the alkali metal salts of cyclic carboxylic acids other than the starting acids.

These objects are achieved by using for the thermal treatment a mixture which is obtained by the action of solutions or suspensions of the metal salts of carboxylic acids whose cation is the active metal ion of the catalyst for the known thermal conversion, on potassium carbonate solutions or suspensions, if desired with heating, in the presence of alkali metal salts of the cyclic carboxylic acids to be converted, followed by removal of the solvent and drying.

The starting mixtures to be used according to the invention are produced by reacting solutions or suspensions of potassium carbonate in the presence of alkali metal salts, in particular potassium salts, other than those of the desired cyclic aromatic carboxylic acids, with solutions or suspensions of the metal salts of carboxylic acids which contain as cation the active cation of the catalyst. Alkali salts of acids other than the desired aromatic carboxylic acids employed are, in particular, the potassium salts and mixtures of the potassium and sodium salts of acids in which the proportion of the sodium salts varies between approx. 0.5 and 70% by weight. Suitable alkali metal salts are, for example, those of benzoic acid, phthalic acid, isophthalic acid, benzenecarboxylic acids with 3 to 6 carboxylic groups, salicylic acid, α and β naphthalene-monocarboxylic acid, naphthalenedicarboxylic acids, pyridine-, pyrrole-, imidazol-, pyrazine-, quinoline-, furan, and thiophene- mono- or dicarboxylic acids.

The only metallic salts of carboxylic acids suitable are those containing the same cation as the catalysts usually employed for the known thermal processes, i.e., in particular, cadmium, zinc and iron. The solvent, preferably water, is employed for the preparation of the solutions or suspensions in an amount of approximately 5 to 50 parts by weight to 100 parts by weight of salt. The amount of solvent is not critical. It depends largely on economic considerations since the solvent has to be removed at the end of the process and may therefore be varied as desired. Suspensions of the salts should be prepared in such a way that they form a pasty material of more or less creamy consistency. A suitable method of combining the potassium carbonate and the alkali metal salts with the metal salts is to react the solution or suspension containing potassium carbonate with a solution or suspension of an alkali metal salt of a cyclic carboxylic acid which can, for example, be readily obtained in the production of the alkali metal salts of the acids by neutralization of solutions of the acids with potassinum carbonate. The mixture is then added to dissolved or suspended metal salts of carboxylic acids. The addition may be carried out in the reverse direction. The mixture is then allowed to react, if desired with heating to approx. 40 to 120° C. The alkali metal salts of the cyclic carboxylic acids can also be mixed with the solutions or suspensions of the metal salts of carboxylic acids and the mixture then combined with solutions or suspensions of potassium carbonate and allowed ot react.

The quantities of potassium carbonate employed for reaction with the metal salt solutions should be approximately equivalent to the quantity of metal salt. An excess of potassium carbonate, for example, an excess of approximately 0.1 to 5 times the calculated quantity, is not disadvantageous. The quantity of metal salt of the carboxylic acids should preferably be between approximately 0.5 to 10% by weight, in particular between 0.5 and 5% and especially between 2 and 5% by weight, calculated on the quantities of alkali metal salts of aromatic cyclic carboxylic acid which must be present during the reaction of the potassium carbonate with the metal salt solution. Suitable metal salts of carboxylic acids, in accordance with the invention, are only those whose cation is present as catalytically active metal ion in the conventional catalysts employed for the known thermal processes for the production of salts of cyclic carboxylic acids from other cyclic carboxylic acids, i.e. especially cadmium, zinc and iron. The acids from which the metal salts are derived may be aliphatic, aromatic or heterocyclic provided that the solubility product of the metal salts of these acids is greater than that of the carbonate of the said metals. Suitable metal salts are, for example, the formates, oxalates, benzoates, phthalates, nicotinates and salicylates of cadmium, zinc and divalent iron. The metal salts employed should preferably be those from which the alkali metal salts of the cyclic carboxylic acids to be converted are derived. Solutions or suspensions of metal salts which are obtained by treatment of the carboxylic acids with the oxides, hydroxides or carbonates of the metal in question are particularly suitable for the production of the mixtures to be thermally converted according to the invention as the introduction of ions of other elements into the solutions or suspensions is thus avoided. It is particularly advantageous, especially in continuous operations, to employ, for the production of the solutions or suspensions of metal salts the pasty residue obtained in the working up of a reaction mixture obtained by purely thermal conversion of the alkali salts of aromatic cyclic carboxylic acids by solution and filtration of the undissolved components.

In the preparation of the solutions or suspensions of the metal salts of the carboxylic acids from these pasty residues it is sufficient if the latter which contain, in addition to carbonaceous constituents, the total catalyst employed in the thermal conversion in the form of oxide or also partially as carbonate together with small amounts of the unreacted starting salts and other products, are treated with any desired carboxylic acid, for example, by heating at approximately 40 to 120° C. If desired, carbonaceous constituents can be filtered off after the treatment. The use of the residues thus enables the total metal in the catalyst and the reacted and unreacted aromatic cyclic carboxylic acids in the residues to be fed back into the process for the production of the alkali metal salts of cyclic carboxylic acids.

As a result of reacting the solutions or suspensions of the metal salts of any desired saturated aliphatic, aromatic or heterocyclic carboxylic acid with potassium carbonate solutions in the presence of the alkali metal salts of the cyclic carboxylic acids which are subsequently converted by heating, the cation of the metal salt is precipitated in the form of the carbonate in a very finely divided state, if desired after heating the mixture to approximately 40 to 100° C. or even 120° C.

The solvent in the suspension thus obtained is removed by evaporation, for example, in a spray evaporator at a temperature exceeding 100° C. and below the temperature selected for the thermal conversion, i.e. at a temperature between 280 and 480° C. In this way a dry mixture is obtained which is particularly suitable for thermal conversion as it has been found that practically every granule of the material contains particles of catalyst enclosed in it in spite of the small proportion of catalyst employed.

The conversion of the mixture prepared as described to cyclic carboxylic acids other than those present in the mixture in preponderant amounts in the form of the alkali metal salts, is carried out in the same way and under the same conditions as in the known thermal processes for the production of salts of cyclic acids. The process is thus carried at temperatures between approximately 280 and 480° C. and at ordinary or reduced pressure, for example 1 to 300 atm., in particular in an atmosphere of carbon dioxide or nitrogen. The dry starting mixture of salts which may be pressed to moulding is introduced into the reaction zone, heated to the reaction temperature, if desired with exclusion of oxygen. Temperatures between 320 and 480° C., preferably between 350 and 460° C., and carbon dioxide pressures of approximately 5 to 35 atm. are selected for the production of terephthalic acid from the potassium salts of benzoic acid, phthalic acid and isophthalic acid or of benzenecarboxylic acids with 3 to 6 carboxyl groups and for the thermal conversion of mixtures of the potassium and sodium salts of the benzenecarboxylic acids referred to, containing 0.5 to 70% by weight of sodium salt, and of corresponding mixtures of potassium and sodium terephthalate.

The free cyclic acids can be obtained from the reaction product from the thermal treatment in the usual way, for example, by dissolving the reaction products in water and acidifying the solutions obtained after removal of the undissolved constituents.

The invention is further illustrated by, but not limited to, the following examples. The parts specified in the examples are parts by weight.

*Example 1*

380 parts phthalic anhydride is introduced into 1100 parts water and heated to approximately 100° C. with stirring. 300 parts zinc oxide is then added slowly to the hot suspension. The mixture acquires a pastry, creamy consistency toward the end of the addition and has a pH of approximately 5.6 when all the zinc oxide has been added.

37 kg. of this basic zinc phthalate compound is added gradually in the form of the previously described suspension to an aqueous 85% by weight suspension containing 261 kg. dipotassium phthalate and 8 kg. potash which is maintained at 120° C. The mixture is then freed from solvent in a spray evaporator after the reaction is complete. In this way a finely powdered mixture of salts is obtained with a bulk density of 0.5 to 0.58 kg./l. The material is dried at 220° C. and the dry material introduced into a conveyor-type reactor as described in U.S. Patent 3,010,802 which has been heated to 435° C. and contains carbon dioxide under a pressure of 20 atm. The material remains in the reactor for a period of 42 minutes. The reaction mixture obtained is worked up and the terephthalic acid precipitated in the manner described in U.S. Patent 2,930,813. In this way a yield of 178.5 kg. of very pure terephthalic acid is obtained, i.e., 95% of the theory.

*Example 2*

A fine suspension of cadmium phthalate of a creamy consistency is prepared by adding 470 parts cadmium oxide to a suspension of 380 parts phthalic anhydride in 1100 parts water at a temperature of approximately 100° C. with stirring.

12 parts of the suspension of cadmium phthalate is added to a solution prepared from 250 parts dipotassium phthalate, 6 parts potassium carbonate and 50 parts water, maintained at 110° C., with stirring. After the addition the mixture is stirred for a further 50 minutes at 110° C. and the solvent then removed by evaporation. The mixture is dried at 320° C. in a spray evaporator and then transferred to a conversion zone maintained at 435° C. containing carbon dioxide under a pressure of 8 atm. The mixture remains in the reaction zone for 30 minutes. The reaction mixture sinters to a dark grey, stony material which is then crushed mechanically and dissolved in water. The undissolved carbonaceous residue is separated from the solution. Terephthalic acid is obtained from the solution by precipitation in the manner described in U.S. Patent 2,930,813. 163.8 parts terephthalic acid of excellent purity is obtained in this way, i.e., a yield of 94% of the theory.

The slurry obtained as residue in the working up of the reaction mixture is employed for the preparation of the cadmium phthalate suspension for the next charge. This residue contains 1% by weight of carbonaceous decomposition products together with the total cadmium in the form of a mixture of cadmium oxide and carbonate. The slurry is stirred into a phthalic acid solution prepared consisting of 3 parts phthalic acid and 21 parts water and the mixture heated for approximately 30 minutes.

The suspension of cadmium phthalate, which has a pH of 5.6 and is almost black as a result of the carbonaceous components of the residue, is allowed to act on a solution of 50 parts water, 6 parts potassium carbonate and 250 parts potassium phthalate in the manner previously described. The solvent is removed, the mixture obtained dried and a reaction mixture obtained by heating as described in paragraph 2 of the example, from which on working up in the usual way by solution and acidification as described in paragraph 2 of this example 164 parts terephthalic acid of excellent purity is obtained.

*Example 3*

A mixture of salts, obtained by thermal conversion, i.e. simply by heating, of a mixture of 93.5 parts potassium benzoate, 15 parts sodium benzoate and 6 parts iron carbonate as catalyst to 440° C. in carbon dioxide at a pressure of 30 atm. is crushed and the mixture dissolved in water with heating. The carbonaceous residue which remains undissolved in the water and which contains the total metal of the catalyst partly as carbonate and partly as oxide and also some potassium and sodium terephthalate and benzoate, is filtered off and washed with water at approximately 80° C. The filtrate is acidified and terephthalic acid precipitated. The acid is filtered off and dried and obtained in a yield of 96 percent of the theory.

The water-insoluble carbonaceous slurry residue, referred to above, is employed for the production of fresh salt mixture for use as starting material for further thermal conversion to terephthalate in accordance with this invention. The residue is heated to 95° C. after the addition of water and 6.5 parts of benzoic acid added to the hot suspension with stirring. The aqueous suspension has a pH of approximately 5.2 after addition of the acid. The suspension thus obtained, containing the catalyst in the form of iron benzoate, is stirred into an 80 percent aqueous suspension of 85 parts potassium benzoate, 15 parts sodium benzoate and 8.5 parts potassium carbonate. The mixture of suspensions is heated to approximately 115° C. to promote the reaction. The slurry is then sprayed in a spray tower heated to approximately 280° C. The mixture of salts obtained from the tower is dried at 180° C. The dried mixture of salts is then converted to terephthalate according to the known process. The conversion is carried out at a temperature of 440° C. while the carbon dioxide pressure is 30 atm. The mixture of salts obtained, consisting substantially of terephthalate, is worked up in the usual way and terephthalic acid obtained in a yield of 54.5 parts, i.e., 95.5 percent of the theory.

What we claim is:

1. In a process for the production of alkali salts of aromatic carboxylic acids by catalytic thermal conversion of a reactant mixture of alkali salts or other aromatic carboxylic acids, the step which comprises preparing said reactant mixture by reacting at a temperature of up to 120° C. a metal salt of a carboxylic acid wherein the cation represents a divalent ion selected from the group consisting of cadium, zinc and iron, with potassium carbonate in an at least equivalent amount up to an excess of five times the calculated amount thereof, with reference to the amount of said metal salt, in the presence of water and in the presence of the alkali metal salt of the aromatic carboxylic acid to be converted, removing the water and drying the resulting mixture.

2. In a process for the production of dipotassium terephthalate by catalytic thermal conversion of a reactant mixture of the potassium salt of another benzene carboxylic acid, the step which comprises preparing said reactant mixture by reacting at a temperature of up to 120° C. a metal salt of a benzene carboxylic acid wherein the cation represents a divalent ion selected from the group consisting of cadmium, zinc and iron with potassium carbonate in an at least equivalent amount up to an excess of five times the calculated amount thereof, with reference to the amount of said metal salt, in the presence of water and in the presence of the potassium salt of the benzene carboxylic acid to be converted, removing the water and drying the resulting mixture.

3. In a process for the production of dipotassium terephthalate by catalytic thermal conversion of dipotassium phthalate, the step which comprises preparing a reactant mixture of dipotassium phthalate and catalyst by reacting zinc phthalate with potassium carbonate in an at least equivalent amount up to an excess of five times the calculated amount thereof, with reference to the amount of said zinc phthalate, at a temperature of up to 120° C. in the presence of water and dipotassium phthalate, said zinc phthalate being employed in an amount between about 0.5 and 5 percent by weight, with reference to the amount of dipotassium phthalate used, removing the water and drying the resulting mixture.

4. A process as claimed in claim 3 wherein the water is employed in an amount of about 5 to 50 parts by weight per 100 parts by weight of dipotassium phthalate.

5. A process as claimed in claim 3 wherein the preparation of the mixture of dipotassium phthalate and catalyst is carried out at a temperature between 40° C. and 120° C.

6. In a process for the production of dipotassium terephthalate by catalytic thermal conversion of potassium benzoate, the step which comprises preparing a reactant mixture of potassium benzoate and catalyst by reacting zinc benzoate with potassium carbonate in an at least equivalent amount up to an excess of five times the calculated amount thereof, with reference to the amount of said zinc benzoate, at a temperature of up to 120° C. in the presence of water and potassium benzoate, said zinc benzoate being employed in an amount between about 0.5 and 5 percent by weight, with reference to the amount of potassium benzoate used, removing the water and drying the resulting mixture.

7. A process as claimed in claim 6 wherein the water is employed in an amount of about 5 to 50 parts by weight per 100 parts by weight of potassium benzoate.

8. A process as claimed in claim 6 wherein the preparation of the mixture of potassium benzoate and catalyst is carried out at a temperature between 40° C. and 120° C.

References Cited by the Examiner

UNITED STATES PATENTS 2,863,913   12/1958   Raecke et al. _____ 260—515

FOREIGN PATENTS 813,182   5/1959   Great Britain.

OTHER REFERENCES

Sherwood: "Chem. and Industry," Aug. 27, 1960, pp. 1096–1100.

LORRAINE A. WEINBERGER, *Primary Examiner.*

LEON ZITVER, *Examiner.*

R. J. JACKSON, T. L. GALLOWAY,
*Assistant Examiners.*

UNITED STATES PATENT OFFICE
CERTIFICATE OF CORRECTION

Patent No. 3,285,955                                  November 15, 1966

Walter Schenk et al.

It is hereby certified that error appears in the above numbered patent requiring correction and that the said Letters Patent should read as corrected below.

Column 2, line 5, for "fro" read -- from --; column 3, line 28, for "ot" read -- to --; column 4, line 63, for "pastry" read -- pasty --; column 6, line 20, for "salts or other" read -- salts of other --.

Signed and sealed this 24th day of October 1967.

(SEAL)
Attest:

Edward M. Fletcher, Jr.
Attesting Officer

EDWARD J. BRENNER
Commissioner of Patents